US012713398B2

(12) United States Patent
Leng et al.

(10) Patent No.: US 12,713,398 B2
(45) Date of Patent: Aug. 18, 2026

(54) WIRELESS COMMUNICATION METHOD RELATED TO PAGING, AND RELAY TERMINAL

(71) Applicant: GUANGDONG OPPO MOBILE TELECOMMUNICATIONS CORP., LTD., Dongguan (CN)

(72) Inventors: Bingxue Leng, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 330 days.

(21) Appl. No.: 18/367,342

(22) Filed: Sep. 12, 2023

(65) Prior Publication Data

US 2024/0007998 A1 Jan. 4, 2024

Related U.S. Application Data

(63) Continuation of application No. PCT/CN2021/092832, filed on May 10, 2021.

(51) Int. Cl.
*H04W 68/02* (2009.01)

(52) U.S. Cl.
CPC .................................. *H04W 68/02* (2013.01)

(58) Field of Classification Search
CPC .................................................... H04W 68/02
USPC ......................................................... 455/458
See application file for complete search history.

(56) References Cited

U.S. PATENT DOCUMENTS

2012/0314569 A1* 12/2012 Liu ..................... H04W 36/304 370/252
2013/0183971 A1* 7/2013 Tamaki ................. H04W 36/08 455/436
2018/0213588 A1 7/2018 Wei
2021/0315057 A1* 10/2021 Baek ..................... H04W 76/10
2022/0132464 A1* 4/2022 Agiwal ............... H04W 72/044
2022/0159776 A1* 5/2022 Li ......................... H04L 43/065
2022/0287114 A1* 9/2022 Liu ....................... H04L 1/1819
2022/0346180 A1* 10/2022 Tseng .................... H04W 76/14
2023/0093649 A1* 3/2023 Wang ................. H04W 68/025 455/458
2024/0007908 A1* 1/2024 Wei ....................... H04W 88/04

(Continued)

FOREIGN PATENT DOCUMENTS

CN 106162676 A 11/2016
CN 107852765 A 3/2018

(Continued)

OTHER PUBLICATIONS

ZTE, "Summary report of [AT113bis-e][603][Relay] Proposals from summary of agenda item 8.7.4.1 (ZTE)", 3GPP TSG-RAN WG2 Meeting #113bis electronic R2-2104405, Online, Apr. 12-Apr. 20, 2021, cited in sections 2.1.3, 2.4.1, 2.4.2. 76 pages.

(Continued)

*Primary Examiner* — Mark G. Pannell
(74) *Attorney, Agent, or Firm* — BAYES PLLC

(57) ABSTRACT

A wireless communication method and device are provided. The method includes: when a paging related configuration release condition is satisfied, a relay terminal releases a paging related configuration of a far-end terminal, and stops monitoring a paging message and/or stops forwarding a paging message for the far-end terminal.

20 Claims, 10 Drawing Sheets

When a condition for releasing paging related configuration is satisfied, a relay terminal releases the paging related configuration of a remote terminal — S210

↓

The relay terminal stops monitoring a paging message for the remote terminal and/or stops forwarding the paging message to the remote terminal — S220

(56) References Cited

U.S. PATENT DOCUMENTS

| | | | | |
|---|---|---|---|---|
| 2024/0057203 | A1 * | 2/2024 | Wu | H04W 36/08 |
| 2024/0073989 | A1 * | 2/2024 | Back | H04W 68/02 |
| 2024/0098815 | A1 * | 3/2024 | Freda | H04W 68/005 |
| 2024/0187963 | A1 * | 6/2024 | Chen | H04W 40/246 |
| 2024/0214848 | A1 * | 6/2024 | Kang | H04W 40/22 |
| 2024/0244509 | A1 * | 7/2024 | Wu | H04B 7/15528 |

FOREIGN PATENT DOCUMENTS

| | | | |
|---|---|---|---|
| CN | 111385856 | A | 7/2020 |
| CN | 111432469 | A | 7/2020 |
| CN | 111726862 | A | 9/2020 |
| WO | 2020186526 | A1 | 9/2020 |

OTHER PUBLICATIONS

International Search Report in the international application No. PCT/CN2021/092832, mailed on Feb. 10, 2022. 6 pages with English translation.

Written Opinion of the International Search Authority in the international application No. PCT/CN2021/092832, mailed on Feb. 10, 2022. 6 pages with English translation.

"3rd Generation Partnership Project; Technical Specification Group Radio Access Network; NR; Radio Resource Control (RRC) protocol specification (Release 16)", 3GPP TS 38.331 V16.3.1 (Jan. 2021), cited in sections 5.3.2. 929 pages.

"3rd Generation Partnership Project; Technical Specification Group Radio Access Network; NR; User Equipment (UE) procedures in Idle mode and RRC Inactive state (Release 16)", 3GPP TS 38.304 V16.4.0 (Mar. 2021), cited in chapter 7. 37 pages.

"3rd Generation Partnership Project; Technical Specification Group Radio Access Network; Study on NR sidelink relay; (Release 17)", 3GPP TR 38.836 V17.0.0 (Mar. 2021), cited in the whole document. 26 pages.

* cited by examiner

Relay terminal 400

Processing unit 410

FIG. 4

Communication device 600

Communication unit 610

FIG. 6

Remote terminal 700

Communication unit 710

FIG. 7

WIRELESS COMMUNICATION METHOD RELATED TO PAGING, AND RELAY TERMINAL

CROSS-REFERENCE TO RELATED APPLICATION

This is a continuation application of International Application No. PCT/CN2021/092832, filed on May 10, 2021, the content of which is hereby incorporated by reference in its entirety.

BACKGROUND

In a wireless communication, a relay technology from a remote terminal to a network refers to a communication technology in which the remote terminal accesses the network through a relay terminal. For example, the remote terminal may send a paging related configuration of the remote terminal to the relay terminal, and the relay terminal may monitor, according to the paging related configuration, a paging message sent by the network device to the remote terminal, and forward the paging message to the remote terminal.

SUMMARY

Embodiments of the present disclosure relate to a field of communication, and more particularly to a wireless communication method and device.

Embodiments of the disclosure provide a wireless communication method and device, when a condition for releasing a paging related configuration is satisfied, a relay terminal releases the paging related configuration of a remote terminal; and the relay terminal stops monitoring a paging message for the remote terminal and/or stops forwarding the paging message to the remote terminal.

In a first aspect, the present disclosure provides a wireless communication method, including: when a condition for releasing paging related configuration is satisfied, a relay terminal releases the paging related configuration of a remote terminal; and the relay terminal stops monitoring a paging message for the remote terminal and stops forwarding the paging message to the remote terminal.

In a second aspect, the present disclosure provides a wireless communication method, including: a relay terminal acquires an updated paging related configuration; and the relay terminal monitors a paging message for a remote terminal according to the updated paging related configuration.

In a third aspect, the present disclosure provides a wireless communication method including: a communication device sends at least one of an indication of releasing paging related configuration, an signaling radio bearer (SRB) 2 message, or a Data Radio Bearer (DRB) message to a relay terminal, to trigger the relay terminal to release the paging related configuration of a remote terminal, and trigger the relay terminal to stop monitoring a paging message for the remote terminal and forwarding the paging message to the remote terminal.

In a fourth aspect, the present disclosure provides a wireless communication method including: a remote terminal sends an updated paging related configuration to a relay terminal. The updated paging related configuration is used for the relay terminal to monitor a paging message for the remote terminal.

In a fifth aspect, the present disclosure provides a relay terminal including a processing unit configured to: when a condition for releasing paging related configuration is satisfied, release the paging related configuration of a remote terminal; and stop monitoring a paging message for the remote terminal and/or stopping forwarding the paging message to the remote terminal.

In a sixth aspect, the present disclosure provides a relay terminal including a communication unit and a processing unit. The communication unit is configured to acquire an updated paging related configuration. The processing unit is configured to monitor a paging message for a remote terminal according to the updated paging related configuration.

In a seventh aspect, the present disclosure provides a communication device including a communication unit configured to send at least one of an indication of releasing paging related configuration, an SRB2 message, or a DRB message to a relay terminal, to trigger the relay terminal to release the paging related configuration of a remote terminal, and trigger the relay terminal to stop monitoring a paging message for the remote terminal and forwarding the paging message to the remote terminal.

In an eighth aspect, the present disclosure provides a remote terminal including a communication unit configured to send an updated paging related configuration to a relay terminal. The updated paging related configuration is used for the relay terminal to monitor a paging message for the remote terminal.

In a ninth aspect, a communication device including a processor and a memory is provided. The memory is configured to store a computer program, and the processor is configured to invoke and run the computer program stored in the memory, to perform the in any of the first to fourth aspects or implementations thereof.

In a tenth aspect, an apparatus is provided. The apparatus is configured to implement the method in any of the first to fourth aspects or implementations thereof.

In particular, the apparatus includes a processor configured to invoke and run a computer program from a memory to cause a device on which the device is mounted to perform the method in any of the first to fourth aspects or implementations thereof described.

In an eleventh aspect, there is provided a computer-readable storage medium configured to store a computer program that causes a computer to perform the method in any of the first to fourth aspects or implementations thereof.

In a twelfth aspect, there is provided a computer program product including computer program instructions that cause a computer to perform the method in any of the first to fourth aspects or implementations thereof.

In a thirteenth aspect, there is provided a computer program that, when run on a computer, causes the computer to perform the method in any of the first to fourth aspects or implementations thereof.

BRIEF DESCRIPTION OF THE DRAWINGS

FIG. 4 is a schematic block diagram of a relay terminal 400 according to an embodiment of the present disclosure.

FIG. 6 is a schematic block diagram of a communication device 600 according to an embodiment of the present disclosure.

FIG. 7 is a schematic block diagram of a remote terminal 700 according to an embodiment of the present disclosure.

DETAILED DESCRIPTION

In a wireless communication, when does the relay terminal release the paging related configuration is an urgent technical problem to be solved by this disclosure. In the present disclosure, when a condition for releasing paging related configuration is satisfied, a relay terminal releases the paging related configuration of a remote terminal; and the relay terminal stops monitoring a paging message for the remote terminal and/or stops forwarding the paging message to the remote terminal. Furthermore, since when the condition for releasing paging related configuration is satisfied, the relay terminal may release the paging related configuration of a remote terminal and stop monitoring the paging message for the remote terminal and/or stop forwarding the paging message to the remote terminal, thereby reducing power consumption of the relay terminal.

The technical scheme of the embodiments of the present disclosure will be described below in conjunction with the drawings in the embodiments of the present disclosure, and it will be apparent that the described embodiments are only part, rather than all, of the embodiments of the present disclosure. Based on the embodiments in the present disclosure, all other embodiments acquired by those skilled in the art without involving any inventive effort shall fall within the scope of protection of the present disclosure.

Before the technical scheme of this disclosure is introduced, the relevant knowledge of the present disclosure will be described as items 1 to 3.

1. The Vehicle to Everything (V2X) system adopts a way of a Device to Device (D2D) direct communication, and defines two transmission modes in 3rd Generation Partnership Project (3GPP): a first mode and a second mode.

Figure 1A:
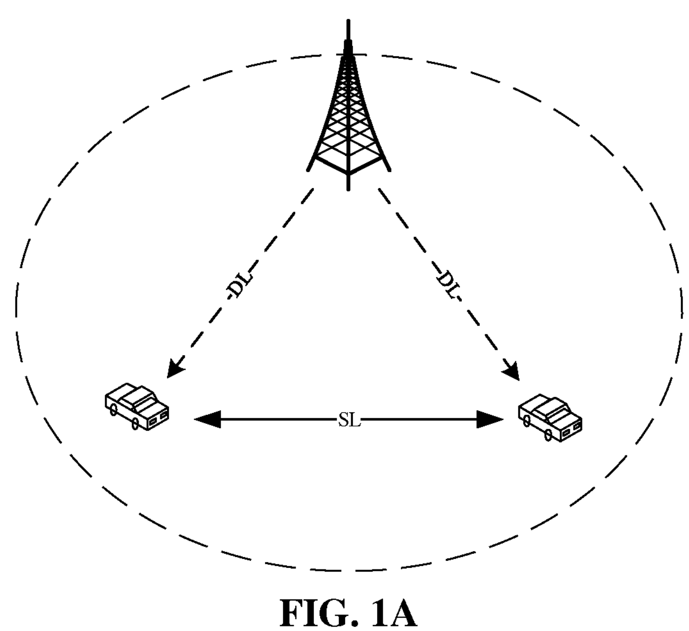
FIG. 1A is a schematic diagram of a first mode provided by the present disclosure.

In a first mode, as shown in FIG. 1A, transmission resources of a terminal may be allocated by a network device, and the terminal may send sidelink data on a sidelink link according to the resources allocated by the network device. The network device may allocate resources for single transmission or resources for semi-static transmission to the terminal.

Figure 1B:
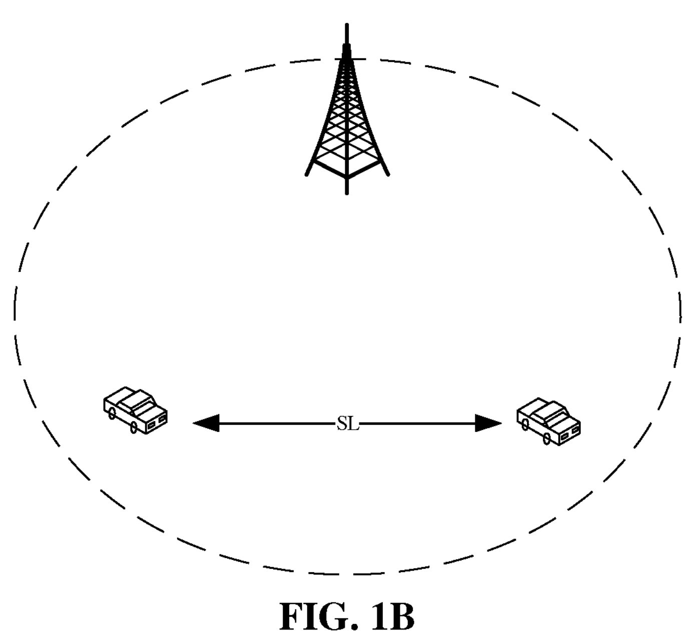
FIG. 1B is a schematic diagram of a second mode provided by the present disclosure.

In the second mode, as shown in FIG. 1B, the terminal itself selects a resource in the resource pool for data transmission. Specifically, the terminal may select transmission resources in the resource pool by sensing, or select transmission resources in the resource pool by random selection.

It should be understood that a terminal or terminal device in the embodiments of the present disclosure may also be called as User Equipment (UE), an access terminal, a subscriber unit, a subscriber station, a mobile station, a remote station, a remote terminal, a mobile device, a user terminal, a terminal, a wireless communication device, a user agent or a user device, etc. The terminal may be a station (ST) in a Wireless Local Area Network (WLAN), a cellular telephone, a cordless telephone, a Session Initiation Protocol (SIP) telephone, a Wireless Local Loop (WLL) station, a Personal Digital Assistant (PDA) device, a handheld device having a wireless communication function, a computing device or other processing device connected to a wireless modem, a terminal device in a next generation communication system such as an New Radio (NR) network, or a terminal device in a future evolved Public Land Mobile Network (PLMN) network, etc.

By way of example and not limitation, in the embodiments of the present disclosure, the terminal device may also be a wearable device. The wearable device can also be called as a wearable smart device, which is a general term of wearable devices that are intelligently designed and developed by applying wearable technology to daily wear, such as, glasses, gloves, watches, clothing and shoes. The wearable device is a portable device that is worn directly on the body or integrated into the user's clothes or accessories. The wearable device is not only a kind of hardware device, but also realizes powerful functions through software support, data interaction and cloud interaction. The generalized wearable smart device has full functions and a large size, and the generalized wearable smart device can realize complete or partial functions without relying on smart phones, such as smart watches or smart glasses, and the generalized wearable smart device only focus on certain application functions and need to be used in conjunction with other devices (such as, smart phones), such as, various smart bracelets and smart jewelry for monitoring physical signs.

It should be understood that the network device shown in FIG. 1A may be a device configured to communicate with a mobile device, and the network device may be an Access Point (AP) in a WLAN, a Base Transceiver Station (BTS) in a Global System of Mobile communication (GSM) or Code Division Multiple Access (CDMA), a NodeB (NB) in a Wideband Code Division Multiple Access (WCDMA), an evolved Node B (eNB or eNodeB) in an Long Term Evolution (LTE), a relay station or an access point, a vehicle-mounted device, a wearable device, a network device or a gNB in an NR network, a network device in a future evolved PLMN network.

2. Paging

There are three main application scenarios of paging in the NR system, which are a paging initiated by a core network, a paging initiated by a gNB and a notification of system message update initiated by gNB.

The Physical Downlink Control Channels (PDCCHs) of the above three paging messages are scrambled with the Public Radio Network Temporary Identity (P-RNTI) configured in the cell. The paging messages initiated by the core network and the paging message initiated by the gNB may contain multiple paging records. Each paging record contains a paging message for a specific terminal device.

TABLE 1 comparison of the three paging messages

| Paging type | Scope of paging | Related state | Identity of convolution | Contained terminal identity |
|---|---|---|---|---|
| Paging initiated by the core network | Tracking area | RRC idle state (RRC_IDLE) | P-RNTI | 5G-Serving-Temporary Mobile Subscriber Identity (5G-S-TMSI) |
| Paging initiated by the gNB | Notification area | RRC inactive state (RRC_INACTIVE) | P-RNTI | Inactive-Radio Network Temporary Identity (I-RNTI) |
| Short Message | cell | RRC idle state (RRC_IDLE), RRC inactive state (RRC_INACTIVE), RRC connected state (RRC_CONNECTED) | P-RNTI | N/A |

The UE may calculate a Paging Frame (PF) and a Paging Occasion (PO) as follows.

PF: (SFN+PF_offset)mod $T=(T \text{ div } N)*(\text{UE\_ID mod } N)$.

The parameters have the following meanings.

SFN represents a frame number of the wireless frame where the PF is located.

PF_offset represents an offset of the wireless frame.

T represents a paging cycle.

N represents a number of PFs within the paging cycle.

UE_ID represents the identity of the UE, and is equal to 5G-S-TMSI mod 1024.

The mod function is a function for obtaining a remainder, and the div function is a division function, i.e., a division is performed on two integers and the quotient and remainder are returned.

PO: $i\_s=\text{floor}(\text{UE\_ID}/N)\text{mod } Ns$

The meanings of the UE_ID and N can be referred to above, and Ns represents the number of POs in a PF, which may be 1, 2 and 4. The floor function is a downward rounding function.

3. The relay technology in sidelink (i.e. the relay technology from the remote terminal to the network provided below).

In the wireless communication, the relay technology from the remote terminal to the network is the communication technology in which the remote terminal accesses the network through the relay terminal. For example, the remote terminal may send a paging related configuration of the remote terminal to the relay terminal, and the relay terminal may monitor, according to the paging related configuration, a paging message sent by the network device to the remote terminal, and forward the paging message to the remote terminal.

The paging related configuration may include at least one of the following: a 5G-S-TMSI of remote terminal; a Pseudo UE_ID of the remote terminal, which may be 5G-S-TMSI mod 1024; a PO of the remote terminal; an I-RNTI of remote terminal; or a specific Discontinuous Reception (DRX) cycle T of the remote terminal.

It should be understood that the network device mentioned herein and below may be a device configured to communicate with a mobile device, and the network device may be a AP in a WLAN, a BTS in a GSM or CDMA, a NB in a WCDMA, an evolved Node B (eNB or eNodeB) in an LTE, a relay station or an access point, a vehicle-mounted device, a wearable device, a network device or a gNB in an NR network, a network device in a future evolved PLMN network, or the network device herein is a core network device, which is not limited herein.

As mentioned above, an urgent technical problem to be solved in this disclosure is when the relay terminal releases the paging related configuration.

In order to solve the technical problem, in the present disclosure, when a condition for releasing paging related configuration is satisfied, the relay terminal releases the paging related configuration of the remote terminal.

The technical scheme of the present disclosure will be described in detail below.

Figure 2:
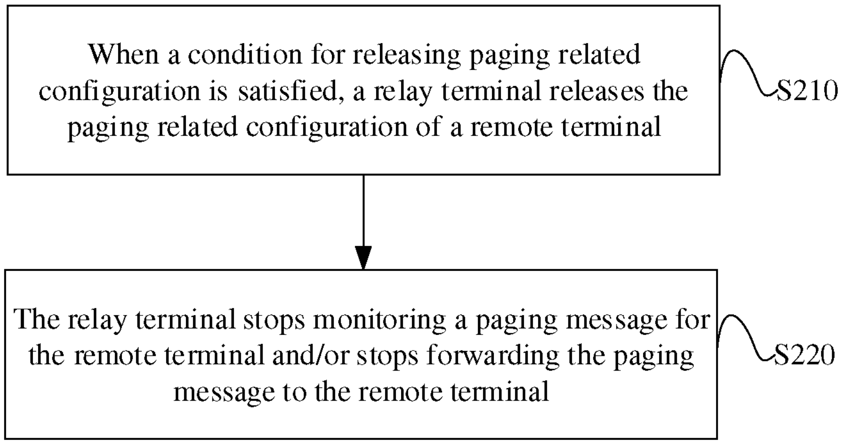
FIG. 2 is a flowchart of a wireless communication method according to an embodiment of the present disclosure.

FIG. 2 is a flowchart of a wireless communication method according to an embodiment of the present disclosure. As shown in FIG. 2, the method includes operations S210 to S220.

In operation S210, when a condition for releasing paging related configuration is satisfied, a relay terminal releases the paging related configuration of a remote terminal.

In operation S220, the relay terminal stops monitoring a paging message for the remote terminal and/or stops forwarding the paging message to the remote terminal.

It should be understood that the condition for releasing paging related configuration is a condition for the relay terminal to release the paging related configuration of the remote terminal.

Optionally, the condition for releasing paging related configuration includes, but is not limited to, at least one of following 1 to 5.

1. The relay terminal has received an indication of releasing paging related configuration.
2. A relay connection between the relay terminal and the remote terminal has been released.
3. The remote terminal is in a connected state.
4. The relay terminal has received a SRB2 message transmitted between the remote terminal and a network device.
5. The relay terminal has received a DRB message transmitted between the remote terminal and the network device.

Optionally, the indication of releasing paging related configuration is used for instructing the relay terminal to release the paging related configuration of the remote terminal.

Optionally, the indication of releasing paging related configuration is from the remote device or the network device.

Optionally, when the remote terminal or network device determines that the remote terminal is in a connected state, i.e. an RRC connected state, the remote terminal or network device may send the indication of releasing paging related configuration to the relay terminal. Optionally, when the network device determines that the relay connection between the relay terminal and the remote terminal has been released, the network device may send the indication of releasing paging related configuration to the relay terminal. Optionally, when the network device determines that the remote terminal is in the connected state and determines that the relay connection between the relay terminal and the remote terminal has been released, the network device may send the indication of releasing paging related configuration to the relay terminal. In summary, the case where the remote terminal or network device sends the indication of releasing paging related configuration is not limited in the present disclosure.

Optionally, if the indication of releasing paging related configuration is from the remote device, the indication of releasing paging related configuration may be carried in the PC5-RRC signaling between the remote terminal and the relay terminal. For example, the indication of releasing paging related configuration may be carried in the RRC reconfiguration signaling or other PC5-RRC signaling between the remote terminal and the relay terminal, which is not limited in the present disclosure.

Optionally, if the indication of releasing paging related configuration is from the network device, the indication of releasing paging related configuration may be carried in the RRC signaling between the network device and the relay terminal. For example, the indication of releasing paging related configuration may be carried in the RRC reconfiguration signaling or other RRC signaling between the network device and the relay terminal, which is not limited in the present disclosure.

It should be understood that the relay connection between the relay terminal and the remote terminal is also called as the connection between the relay terminal and the remote terminal, which is not limited in the present disclosure.

It should be understood that, when the remote terminal is in the connected state, the remote terminal may receive the paging message without through the relay terminal, and/or the remote terminal does not need to receive the paging message.

It should be understood that the paging message in the embodiments of the present disclosure may be a paging initiated by the core network, a paging initiated by a gNB or a notification of system message update initiated by gNB, which is not limited in the present disclosure.

It should be understood that the case where the relay terminal has received an SRB2 message between the remote terminal and the network device indicates that the remote terminal is in the connected state. In this case, the relay terminal may release the paging related configuration of the remote terminal. Similarly, the case where the relay terminal has received a DRB message between the remote terminal and the network device indicates that the remote terminal is in the connected state. In this case, the relay terminal may release the paging related configuration of the remote terminal.

To sum up, in the present disclosure, when the condition for releasing paging related configuration is satisfied, the relay terminal releases the paging related configuration of the remote terminal; and the relay terminal stops monitoring a paging message for the remote terminal and stops forwarding the paging message to the remote terminal. Furthermore, since when the condition for releasing paging related configuration is satisfied, the relay terminal may release the paging related configuration of a remote terminal, stop monitoring the paging message for the remote terminal and stop forwarding the paging message to the remote terminal, so that the power consumption of the relay terminal may be reduced.

Figure 3:
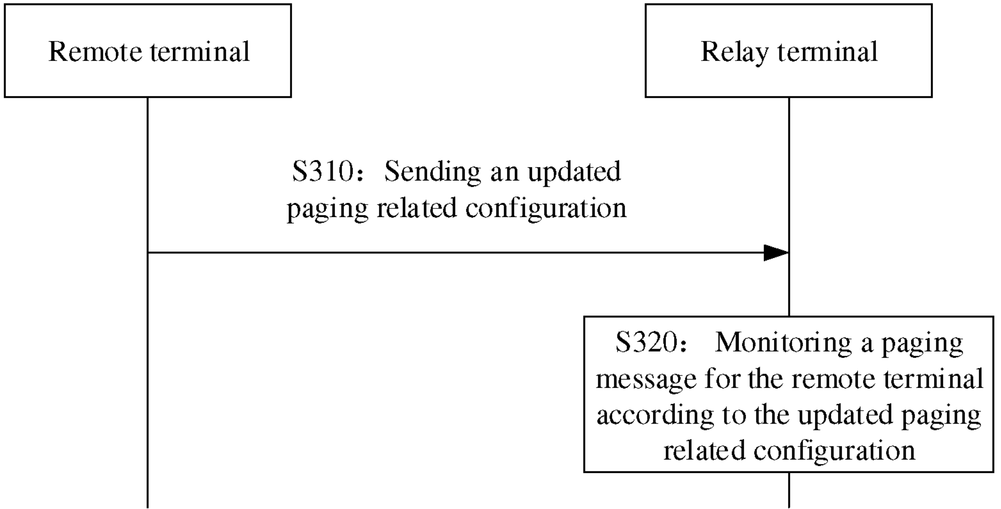
FIG. 3 is an interactive flowchart of a wireless communication method according to an embodiment of the present disclosure.

FIG. 3 is an interactive flowchart of a wireless communication method according to an embodiment of the present disclosure. As shown in FIG. 3, the method includes operations S310 to S320.

In operation S310, the remote terminal sends an updated paging related configuration to a relay terminal.

In operation S320, the relay terminal monitors a paging message for the remote terminal according to the updated paging related configuration.

As described above, the paging related configuration of the remote terminal may include at least one of following: the 5G-S-TMSI of remote terminal; the Pseudo UE ID of the remote terminal, which may be 5G-S-TMSI mod 1024; the PO of the remote terminal; the I-RNTI of remote terminal; and the specific DRX cycle T of the remote terminal.

Therefore, the updated paging related configuration of the remote terminal may be the paging related configuration obtained by updating at least one of the above mentioned items. For example, the paging related configuration of the remote terminal includes: 5G-S-TMSI of the remote terminal; the updated PO of the remote terminal; and the specific DRX cycle T of the remote terminal. That is to say, the PO of the remote terminal has been updated.

Optionally, the updated paging related configuration is obtained when a condition for updating a paging related configuration is satisfied, i.e. when the remote terminal satisfies the condition for updating paging related configuration, the paging related configuration of the remote terminal is updated.

Optionally, the condition for updating paging related configuration includes, but is not limited to, at least one of following 1 to 6.

1. The relay terminal is switched to a new cell.
2. The remote terminal is switched to a new cell.
3. An identity of the remote terminal is updated.
4. A DRX cycle of the remote terminal is updated.
5. A PF of the remote terminal is updated.
6. A PO of the remote terminal is updated.

Optionally, the relay terminal and/or the remote terminal is switched to the new cell such that at least one of the DRX cycle, PF, PO of the remote terminal is updated. For example, when the relay terminal is switched to the new cell, at least one of the following may be changed: the frame number of the wireless frame where the PF is located, the offset of the wireless frame, the paging cycle, and the number of PFs within the paging cycle of the relay terminal. Based on this, the PF of the relay terminal is changed by referring to the formula for calculating the PF, and then the PO of the relay terminal is updated, thus the PO of the remote terminal is updated. For another example, when the remote terminal is switched to a new cell, at least one of the following may be changed: the frame number of the wireless frame where the PF is located, the offset of the wireless frame, the paging cycle, and the number of PFs within the paging cycle of the relay terminal. Based on this, the PF of the remote terminal is changed by referring to the aforementioned formula for calculating the PF, and then the PO of the remote terminal is updated.

Optionally, the identity of the remote terminal is a 5G-S-TMSI of the remote terminal or an I-RNTI of the remote terminal, but is not limited thereto.

Optionally, the DRX cycle of the remote terminal may be updated for, but is not limited to, the reason that the relay terminal and/or the remote terminal handover to a new cell.

Optionally, the PF of the remote terminal may be updated for, but is not limited to, the reason that the relay terminal and/or the remote terminal handover to a new cell.

Optionally, the PO of the remote terminal may be updated for, but is not limited to, the following reason that the relay terminal and/or the remote terminal handover to a new cell.

Optionally, the updated paging related configuration may be carried in the PC5-RRC signaling between the remote terminal and the relay terminal. For example, the indication of releasing paging related configuration may be carried in the RRC reconfiguration signaling or in other PC5-RRC signaling between the remote terminal and the relay terminal, which is not limited herein.

Furthermore, after obtaining the updated paging related configuration, the relay terminal may monitor the paging message for the remote terminal according to the updated paging related configuration. For example, the relay terminal may monitor the paging message on the updated PF and/or updated PO.

To sum up, in the present disclosure, when the paging related configuration of the remote terminal is updated, the relay terminal can timely monitor the paging message for the remote terminal according to the updated paging related configuration.

Figure 4:
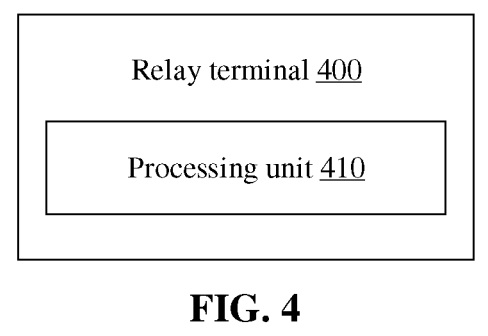

FIG. 4 is a schematic block diagram of a relay terminal 400 according to an embodiment of the present disclosure. As shown in FIG. 4, the relay terminal 400 includes a processing unit 410 configured to: when a condition for releasing paging related configuration is satisfied, release the paging related configuration of a remote terminal; and stop monitoring a paging message for the remote terminal and/or stopping forwarding the paging message to the remote terminal.

Optionally, the condition for releasing the paging related configuration includes at least one of following five items.

The relay terminal has received an indication of releasing paging related configuration.

A relay connection between the relay terminal and the remote terminal has been released.

The remote terminal is in a connected state.

The relay terminal has received a SRB2 message transmitted between the remote terminal and a network device.

The relay terminal has received a DRB message transmitted between the remote terminal and the network device.

Optionally, the indication of releasing paging related configuration is from the remote device or the network device.

Optionally, the indication of releasing paging related configuration is carried in a RRC signaling.

Optionally, the indication of releasing paging related configuration is carried in a RRC reconfiguration signaling.

Optionally in some embodiments, the communication unit may be a communication interface or transceiver or an input-output interface of a communication chip or a system-on-chip.

It should be understood that the relay terminal 400 according to the embodiment of the present disclosure may correspond to the relay terminal in the method embodiments corresponding to FIG. 2, and the above and other operations and/or functions of each unit in the relay terminal 400 is configured to implement the respective process, performed by the relay terminal 400, of the method embodiments corresponding to FIG. 2, which are not repeated herein for the sake of brevity.

Figure 5:
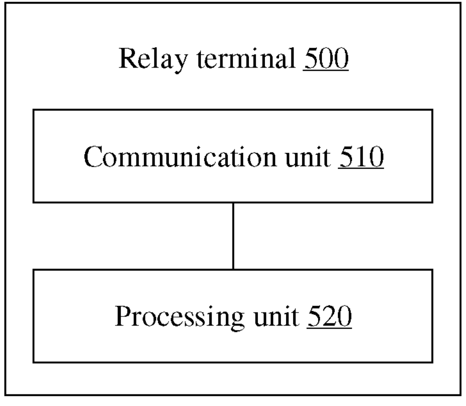
FIG. 5 is a schematic block diagram of a relay terminal 500 according to an embodiment of the present disclosure.

FIG. 5 is a schematic block diagram of a relay terminal 500 according to an embodiment of the present disclosure. As shown in FIG. 5, the relay terminal 500 includes a communication unit 510 and a processing unit 520.

The communication unit 510 is configured to acquire an updated paging related configuration.

The processing unit 520 is configured to monitor a paging message for a remote terminal according to the updated paging related configuration.

Optionally, the updated paging related configuration is obtained when a condition for updating paging related configuration is satisfied.

Optionally, the condition for updating paging related configuration includes at least one of following six items.

The relay terminal is switched to a new cell.

The remote terminal is switched to a new cell.

The identity of the remote terminal is updated.

A DRX cycle of the remote terminal is updated.

A PF of the remote terminal is updated.

A PO of the remote terminal is updated.

Optionally, the identity of the remote terminal is a 5G-S-TMSI of the remote terminal or an I-RNTI of the remote terminal.

Optionally, in some embodiments, the communication unit may be a communication interface or transceiver or an input-output interface of a communication chip or a system-on-chip. The processing unit may be one or more processors.

It should be understood that the relay terminal 500 according to the embodiment of the present disclosure may correspond to the relay terminal the method embodiments corresponding to FIG. 3, and the above and other operations and/or functions of each units in the relay terminal 500 is configured to implement the respective process, performed by the relay terminal, of the method embodiments corresponding to FIG. 3, which are not repeated herein for the sake of brevity.

Figure 6:
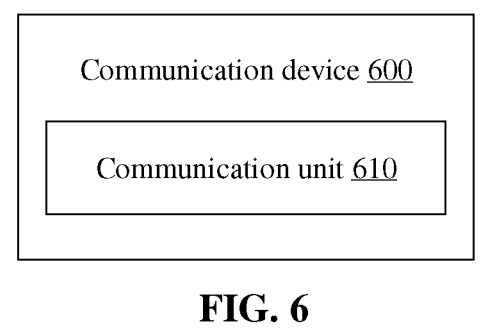

FIG. 6 is a schematic block diagram of a communication device 600 according to an embodiment of the present disclosure. As shown in FIG. 6, the communication device 600 includes a communication unit 610 configured to send at least one of the following: an indication of releasing paging related configuration, an SRB2 message, and a DRB message to a relay terminal, to trigger the relay terminal to release the paging related configuration of a remote terminal, and trigger the relay terminal to stop monitoring a paging message for the remote terminal and forwarding the paging message to the remote terminal.

Optionally, the communication device is a remote device or a network device.

Optionally, the indication of releasing paging related configuration is carried in a RRC signaling.

Optionally, the indication of releasing paging related configuration is carried in a RRC reconfiguration signaling.

Optionally in some embodiments, the communication unit may be a communication interface or transceiver or an input-output interface of a communication chip or a system-on-chip.

It should be understood that the communication device 600 according to the embodiment of the present disclosure may correspond to the remote terminal or network device in the method embodiments corresponding to FIG. 2, and the above and other operations and/or functions of each unit in the communication device 600 is configured to implement the respective process, performed by the remote terminal or network device, of the method embodiments corresponding to FIG. 2, which are not repeated herein for the sake of brevity.

Figure 7:
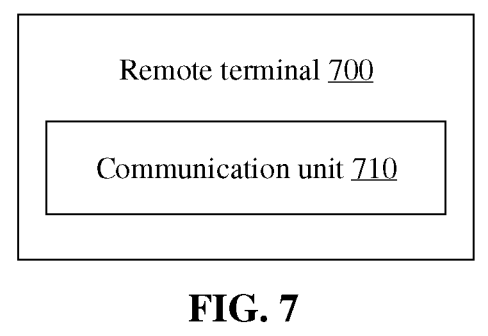

FIG. 7 is a schematic block diagram of a remote terminal 700 according to an embodiment of the present disclosure. As shown in FIG. 7, the remote terminal 700 includes a communication unit 710 configured to send an updated paging related configuration to a relay terminal. The updated paging related configuration is used for the relay terminal to monitor a paging message for the remote terminal.

Optionally, the updated paging related configuration is obtained when a condition for updating paging related configuration is satisfied.

Optionally, the condition for updating paging related configuration includes at least one of following six items.

The relay terminal is switched to a new cell.

The remote terminal is switched to a new cell.

The identity of the remote terminal is updated.

The DRX cycle of the remote terminal is updated.

The PF of the remote terminal is updated.

The PO of the remote terminal is updated.

Optionally, the identity of the remote terminal is a 5G-S-TMSI of the remote terminal or an I-RNTI of the remote terminal.

Optionally in some embodiments, the communication unit may be a communication interface or transceiver or an input-output interface of a communication chip or a system-on-chip.

It should be understood that the remote terminal 700 according to the embodiment of the present disclosure may correspond to the remote terminal in the method embodiments corresponding to FIG. 3 of the present disclosure, and the above and other operations and/or functions of each unit in the remote terminal 700 is configured to implement the respective process, performed by the remote terminal, of the method embodiments corresponding to FIG. 3, which are not repeated herein for the sake of brevity.

Figure 8:
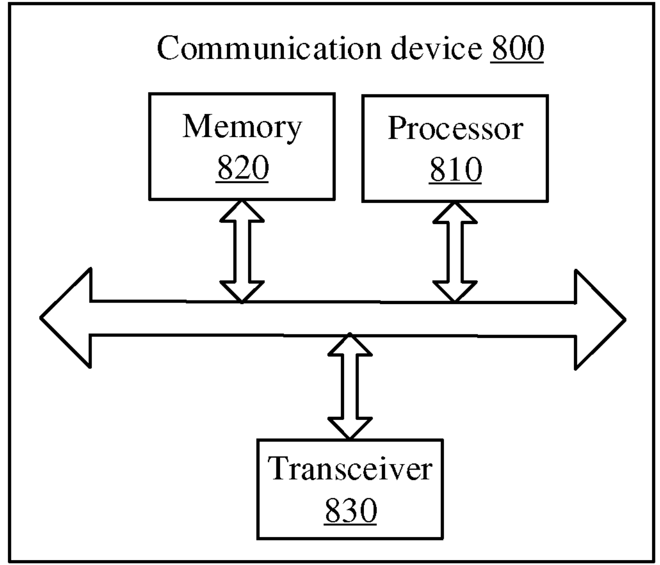
FIG. 8 is a schematic structural diagram of a communication device 800 according to an embodiment of the present disclosure.

FIG. 8 is a schematic structural diagram of a communication device 800 according to an embodiment of the present disclosure. The communication device 800 shown in FIG. 8 includes a processor 810 configured to invoke and run a computer program from a memory to implement the method in the embodiments of the present disclosure.

Optionally, as shown in FIG. 8, the communication device 800 may also include a memory 820. The processor 810 may invoke and run a computer program from the memory 820 to implement the method in the embodiments of the present disclosure.

The memory 820 may be a separate device independent of the processor 810 or may be integrated in the processor 810.

Optionally, as shown in FIG. 8, the communication device 800 may also include a transceiver 830. The processor 810 may control the transceiver 830 to communicate with other devices, in particular, to send information or data to other devices, or receive information or data sent by other devices.

The transceiver 830 may include a transmitter and a receiver. The transceiver 830 may further include an antenna(s), the number of which may be one or more.

Optionally, the communication device 800 can be specifically a relay terminal of the embodiments of the present disclosure, and the communication device 800 can implement the corresponding process implemented by the relay terminal in various methods of the embodiments of the present disclosure, which will not be repeated here for the sake of brevity.

Optionally, the communication device 800 can be the remote device of the embodiments of the present disclosure, and the communication device 800 can implement the corresponding process implemented by the remote device in the various methods of the embodiments of the present disclosure, which will not be repeated here for the sake of brevity.

Optionally, the communication device 800 can be the network device of the embodiments of the present disclosure, and the communication device 800 can implement the corresponding process implemented by the network device in the various methods of the embodiments of the present disclosure, which will not be repeated here for the sake of brevity.

Figure 9:
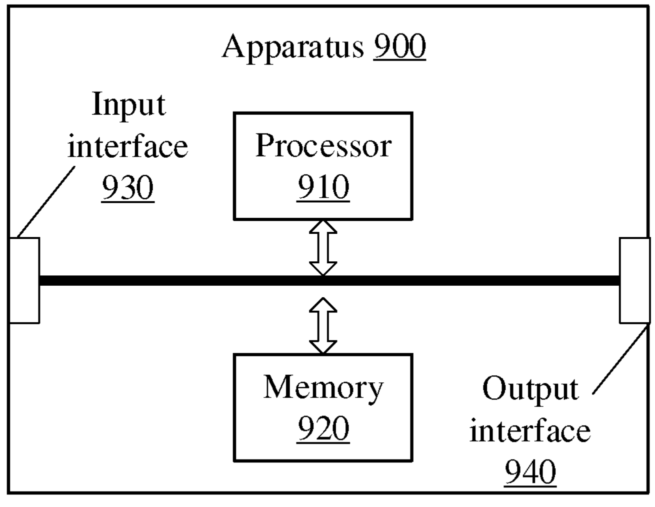
FIG. 9 is a schematic structural diagram of an apparatus according to an embodiment of the present disclosure.

FIG. 9 is a schematic structural diagram of an apparatus according to an embodiment of the present disclosure. The apparatus 900 shown in FIG. 9 includes a processor 910 configured to invoke and run a computer program from a memory to implement the method in the embodiments of the present disclosure.

Optionally, as shown in FIG. 9, the apparatus 900 may also include a memory 920. The processor 910 may invoke and run a computer program from the memory 920 to implement the methods in embodiments of the present disclosure.

The memory 920 may be a separate device independent of the processor 910 or may be integrated in the processor 910.

Optionally, the apparatus 900 may also include an input interface 930. The processor 910 may control the input interface 930 to communicate with other devices or chips and in particular may acquire information or data sent by other devices or chips.

Optionally, the apparatus 900 may also include an output interface 940. The processor 910 may control the output interface 940 to communicate with other devices or chips, and in particular, may output information or data to other devices or chips.

Optionally, the apparatus can be applied to the relay terminal in the embodiments of the present disclosure, and the apparatus can implement the corresponding process implemented by the relay terminal in various methods of the embodiments of the present disclosure, which will not be repeated herein for the sake of brevity.

Optionally, the apparatus can be applied to the remote terminal in the embodiments of the present disclosure, and the apparatus can implement the corresponding process implemented by the remote terminal in the various methods of the embodiments of the present disclosure, which will not be repeated herein for the sake of brevity.

Optionally, the apparatus can be applied to the network device in the embodiments of the present disclosure, and the apparatus can implement the corresponding process implemented by the network device in various methods of the embodiments of the present disclosure, which will not be repeated herein for the sake of brevity.

Optionally, the device mentioned in the embodiments of the present disclosure may also be a chip. For example, the device may be a system level chip, a system chip, a chip system or an on-chip system chip.

It is to be understood that the processor of the embodiment of the present disclosure may be an integrated circuit chip with signal processing capability. In the implementation process, each step of the above method embodiment can be completed by the instruction in the form of integrated logic circuit of hardware or software in the processor. The above processors can be general purpose processors, digital signal processors (DSPS), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the present disclosure can be implemented or executed. The general-purpose processor may be a microprocessor or the processor may be any conventional processor or the like. The steps of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

It is to be understood that the memory in the embodiments of the present disclosure may be volatile memory or non-volatile memory, or may include both volatile and non-volatile memory. The non-volatile memory can be read-only memory (ROM), programmable ROM (PROM), erasable Prom (EPROM), electrically erasable EPROM (EEPROM) or flash memory. Volatile memory can be random access memory (RAM), which is used as an external cache. Many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM) and direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiments of the present disclosure can also be static RAM (SRAM), dynamic RAM (DRAM), synchronous dynamic random access memory (SDRAM), double data rate SDRAM (DDR SDRAM), enhanced SDRAM (ESDRAM), synchronous link DRAM (SLDRAM), direct RAM (DR RAM), etc. That is to say, the memory in the embodiments of the present disclosure is intended to include, but not limited to, these and any other suitable types of memory.

The embodiments of the present disclosure also provide a computer-readable storage medium for storing computer programs.

Optionally, the computer-readable storage medium can be applied to the network device or base station in the embodiments of the present disclosure, and the computer program enables the computer to perform the corresponding process implemented by the network device or base station in the various methods of the embodiments of the present disclosure, which will not be repeated here for brevity.

Optionally, the computer-readable storage medium can be applied to the mobile terminal or terminal device in the embodiments of the present disclosure, and the computer program enables the computer to perform the corresponding process implemented by the mobile terminal or terminal device in the various methods of the embodiments of the present disclosure, which will not be repeated herein for the sake of brevity.

The embodiments of the disclosure also provide a computer program product, including computer program instructions.

Optionally, the computer program product can be applied to the network device or base station in the embodiments of the present disclosure, and the computer program instructions enable the computer to perform the corresponding process implemented by the network device or base station in various methods of the embodiments of the disclosure, which is not repeated herein for brevity.

Optionally, the computer program product can be applied to the mobile terminal or terminal device in the embodiments of the present disclosure, and the computer program instructions enable the computer to perform the corresponding process implemented by the mobile terminal or terminal device in various methods of the embodiments of the disclosure, which is not repeated herein for brevity.

The embodiments of the disclosure also provide a computer program.

Optionally, the computer program can be applied to the network device or base station in the embodiments of the present disclosure. When the computer program runs on the computer, the computer performs the corresponding process implemented by the network device or base station in various methods of the embodiments of the disclosure, which is not repeated herein for the sake of brevity.

Optionally, the computer program can be applied to the mobile terminal or terminal device in the embodiments of the present disclosure. When the computer program runs on the computer, the computer performs the corresponding process implemented by the mobile terminal or terminal device in various methods of the embodiments of the disclosure, which is not repeated herein for the sake of brevity.

Those of ordinary skill in the art may realize that the unit and algorithm steps of each example described in combination with the disclosed embodiments herein can be realized by the combination of electronic hardware, or computer software and electronic hardware. Whether these functions are performed in hardware or software depends on the specific application and design constraints of the technical solution. A professional technician may use different methods to implement the described functions for each specific application, but such implementation shall not be considered beyond the scope of the present disclosure.

Those skilled in the art can clearly understand that for the convenience and simplicity of the description, the specific working process of the system, device and unit described above can refer to the corresponding process in the embodiment of the method described above, and will not be described herein.

In several embodiments provided by the present disclosure, it should be understood that the disclosed systems, apparatus and methods can be realized in other ways. For example, the apparatus embodiments described above is only schematic. For example, the division of the unit is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the unit displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit.

If the function is realized in the form of a software function unit and sold or used as an independent product, it can be stored in a computer readable storage medium. Based on such understanding, the technical solution of the present disclosure, in essence or in the form of a software product, which is stored in a storage medium, includes several instructions for making a computer device (which can be a personal computer, a server, a network device, etc.) to perform all or part of the steps of the method according to each embodiment of the present disclosure. The aforementioned storage media include: U disk, mobile hard disk, ROM, RAM, disk or optical disk and other media that can store program code.

The above is only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

What is claimed is:

1. A wireless communication method, comprising:

when a condition for releasing paging related configuration is satisfied, releasing, by a relay terminal, a paging related configuration of a remote terminal, wherein the condition for releasing paging related configuration comprises that the relay terminal has received an indication of releasing paging related configuration from the remote terminal, and the paging related configuration of the remote terminal comprises at least one of following: a 5G-serving-temporary mobile subscriber identity (5G-S-TMSI) of the remote terminal; a pseudo user equipment (UE) identifier (ID) of the remote terminal, which is 5G-S-TMSI mod 1024; a paging occasion (PO) of the remote terminal; an inactive-radio network temporary identity (I-RNTI) of the remote terminal; or a specific discontinuous reception (DRX) cycle T of the remote terminal; and stopping, by the relay terminal, monitoring a paging message for the remote terminal and/or stopping forwarding the paging message to the remote terminal.

2. The method of claim 1, wherein the condition for releasing paging related configuration further comprises:

the remote terminal is in a connected state.

3. The method of claim 2, wherein the indication of releasing paging related configuration is carried in a Radio Resource Control (RRC) signaling.

4. The method of claim 3, wherein the indication of releasing paging related configuration is carried in a RRC reconfiguration signaling.

5. The method of claim 1, wherein the condition for releasing paging related configuration further comprises at least one of:

a relay connection between the relay terminal and the remote terminal has been released;

the relay terminal has received a signaling radio bearer (SRB) 2 message transmitted between the remote terminal and a network device; or the relay terminal has received a Data Radio Bearer (DRB) message transmitted between the remote terminal and the network device.

6. The method of claim 1, wherein the indication of releasing paging related configuration is used for instructing the relay terminal to release the paging related configuration of the remote terminal.

7. The method of claim 1, wherein the method further comprises:

receiving, by the relay terminal, an updated paging related configuration sent from the remote terminal, wherein the updated paging related configuration is used for the relay terminal to monitor a paging message for the remote terminal.

8. The method of claim 7, wherein the updated paging related configuration is obtained when a condition for updating paging related configuration is satisfied.

9. The method of claim 8, wherein the condition for updating paging related configuration comprises at least one of:

an identity of the remote terminal is updated; or a Discontinuous Reception (DRX) cycle of the remote terminal is updated.

10. The method of claim 9, wherein the identity of the remote terminal is a 5G-Serving-Temporary Mobile Subscriber Identity (5G-S-TMSI) of the remote terminal or an Inactive-Radio Network Temporary Identity (I-RNTI) of the remote terminal.

11. A relay terminal, comprising a processor and a memory configured to store a computer program, wherein the processor is configured to invoke and run the computer program stored in the memory, to perform a wireless communication method comprising:

when a condition for releasing paging related configuration is satisfied, releasing a paging related configuration of a remote terminal, wherein the condition for releasing paging related configuration comprises that the relay terminal has received an indication of releasing paging related configuration from the remote terminal, and the paging related configuration of the remote terminal comprises at least one of following: a 5G-serving-temporary mobile subscriber identity (5G-S-TMSI) of the remote terminal; a pseudo user equipment (UE) identifier (ID) of the remote terminal, which is 5G-S-TMSI mod 1024; a paging occasion (PO) of the remote terminal; an inactive-radio network temporary identity (I-RNTI) of the remote terminal; or a specific discontinuous reception (DRX) cycle T of the remote terminal; and stopping monitoring a paging message for the remote terminal and/or stopping forwarding the paging message to the remote terminal.

12. The relay terminal of claim 11, wherein the condition for releasing paging related configuration further comprises:

the remote terminal is in a connected state.

13. The relay terminal of claim 12, wherein the indication of releasing paging related configuration is carried in a Radio Resource Control (RRC) signaling.

14. The relay terminal of claim 13, wherein the indication of releasing paging related configuration is carried in a RRC reconfiguration signaling.

15. The relay terminal of claim 11, wherein the condition for releasing paging related configuration further comprises at least one of:

a relay connection between the relay terminal and the remote terminal has been released;

the relay terminal has received a signaling radio bearer (SRB) 2 message transmitted between the remote terminal and a network device; or the relay terminal has received a Data Radio Bearer (DRB) message transmitted between the remote terminal and the network device.

16. The relay terminal of claim 11, wherein the indication of releasing paging related configuration is used for instructing the relay terminal to release the paging related configuration of the remote terminal.

17. The relay terminal of claim 11, wherein the processor is configured to invoke and run the computer program stored in the memory to further perform:

receiving an updated paging related configuration sent from the remote terminal, wherein the updated paging related configuration is used for the relay terminal to monitor a paging message for the remote terminal.

18. The relay terminal of claim 17, wherein the updated paging related configuration is obtained when a condition for updating paging related configuration is satisfied.

19. The relay terminal of claim 18, wherein the condition for updating paging related configuration comprises at least one of:

an identity of the remote terminal is updated; or a Discontinuous Reception (DRX) cycle of the remote terminal is updated.

20. The relay terminal of claim 19, wherein the identity of the remote terminal is a 5G-Serving-Temporary Mobile Subscriber Identity (5G-S-TMSI) of the remote terminal or an Inactive-Radio Network Temporary Identity (I-RNTI) of the remote terminal.

* * * * *